United States Patent
Stelter (10) Patent No.: US 9,988,025 B2
(45) Date of Patent: Jun. 5, 2018

(54) METHOD FOR ASCERTAINING A PRESSURE-VOLUME CHARACTERISTIC OF A BRAKING SYSTEM OF A VEHICLE, AND EVALUATION AND/OR CONTROL APPARATUS FOR AT LEAST ONE BRAKING SYSTEM COMPONENT OF A BRAKING SYSTEM OF A VEHICLE

(71) Applicant: Robert Bosch GmbH, Stuttgart (DE)

(72) Inventor: Friedrich Stelter, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/059,422

(22) Filed: Mar. 3, 2016

(65) Prior Publication Data

US 2016/0272174 A1 Sep. 22, 2016

(30) Foreign Application Priority Data

Mar. 17, 2015 (DE) .................. 10 2015 204 764

(51) Int. Cl.
*B60T 8/172* (2006.01)
*B60T 13/66* (2006.01)
(Continued)

(52) U.S. Cl.
CPC .............. *B60T 8/172* (2013.01); *B60T 8/885* (2013.01); *B60T 13/662* (2013.01); *B60T 17/22* (2013.01);
(Continued)

(58) Field of Classification Search
CPC ........ B60T 8/172; B60T 8/885; B60T 13/662; B60T 17/22; B60T 2270/406; B60T 2270/14
See application file for complete search history.

(56) References Cited

U.S. PATENT DOCUMENTS 5,788,337 A * 8/1998 Eckert .................... B60T 8/172
303/11
6,243,639 B1 * 6/2001 Haeussler ............ B60T 8/4275
303/15

(Continued)

FOREIGN PATENT DOCUMENTS

WO WO 2013/189858 12/2013
WO WO 2013189858 A1 * 12/2013 ............ B60T 13/662

OTHER PUBLICATIONS

Espacenet Translation of WO 2013/189858 A1, Betz et al, Dec. 27, 2013, 24 pages.*

*Primary Examiner* — Dale W Hilgendorf
(74) *Attorney, Agent, or Firm* — Norton Rose Fulbright US LLP; Gerard Messina (57) ABSTRACT

A method for ascertaining a pressure-volume characteristic of a vehicle braking system includes determining at least a first pressure-volume value pair of a first pressure occurring in the braking system during a pressure rise and of a first volume displaced in order to produce the first pressure, deriving a second pressure-volume value pair for a second pressure higher than the first pressure or for a second volume greater than the first volume in consideration at least of the first pressure-volume value pair and an indication in a predefined characteristic curve of a volume difference between a first volume associated with the first pressure and a second volume associated with the second pressure, or of a pressure difference between a first pressure associated with the first volume and a second pressure associated with the second volume.

13 Claims, 3 Drawing Sheets

(51) Int. Cl.
*B60T 17/22* (2006.01)
*B60T 8/88* (2006.01)

(52) U.S. Cl.
CPC ..... *B60T 2270/14* (2013.01); *B60T 2270/406* (2013.01)

(56) References Cited

U.S. PATENT DOCUMENTS

| | | | | |
|---|---|---|---|---|
| 6,533,365 | B1* | 3/2003 | Hachtel | B60T 13/662 303/11 |
| 2013/0134771 | A1* | 5/2013 | Foitzik | B60T 8/885 303/20 |
| 2015/0021978 | A1* | 1/2015 | Feigel | B60T 17/22 303/15 |
| 2016/0052501 | A1* | 2/2016 | Darscht | B60T 17/22 701/70 |

* cited by examiner

METHOD FOR ASCERTAINING A PRESSURE-VOLUME CHARACTERISTIC OF A BRAKING SYSTEM OF A VEHICLE, AND EVALUATION AND/OR CONTROL APPARATUS FOR AT LEAST ONE BRAKING SYSTEM COMPONENT OF A BRAKING SYSTEM OF A VEHICLE

CROSS REFERENCE

The present application claims the benefit under 35 U.S.C. § 119 of German Patent Application No. 102015204764.4 filed on Mar. 17, 2015, which is expressly incorporated herein by reference in its entirety.

FIELD

The present invention relates to a method for ascertaining a pressure-volume characteristic of a braking system of a vehicle. The present invention likewise relates to an evaluation and/or control apparatus for at least one braking system component of a braking system of a vehicle. The present invention furthermore relates to a brake booster for a braking system of a vehicle, to a hydraulic assemblage control device for a braking system of a vehicle, and to a braking system for a vehicle.

BACKGROUND INFORMATION

Published PCT Application No. WO 2013/189858 A1 describes a method for ascertaining a pressure-volume characteristic of vehicle brakes. In order to ascertain the pressure-volume characteristic of the respective braking system, it is necessary firstly to ascertain by way of a pressure sensor, at several points in time during a braking operation executed by way of the braking system, the pressure values existing at the respective points in time; and at the same time to ascertain, by way of a volume sensor or travel sensor, the brake fluid volume delivered to the braking system at the respective points in time as a result of the braking operation. The respectively ascertained values are then plotted as a pressure-volume characteristic curve. It is then said to be possible to determine, by way of a comparison between the currently plotted pressure-volume characteristic curve and an initial or predefined pressure-volume characteristic, correction factors on the basis of which influencing factors (for example, a temperature, wear, or transverse acceleration) are said to be capable of being filtered out.

SUMMARY

The present invention provides a method for ascertaining a pressure-volume characteristic of a braking system of a vehicle; an evaluation and/or control apparatus for at least one braking system component of a braking system of a vehicle; a brake booster for a braking system of a vehicle; a hydraulic assemblage control device for a braking system of a vehicle; and a braking system for a vehicle.

In accordance with example embodiments of the present invention, a pressure-volume characteristic of a braking system of a vehicle is ascertained during a braking operation executed by way of the respective braking system. Events that negatively affect the pressure-volume characteristic, such as cornering, can thus also be detected at the beginning of the next braking operation in terms of their effects on the braking system or on its pressure-volume characteristic. Measures can thus be taken, during the braking operation itself, to ensure continued standard or desired functionality of the braking system despite the existing effects on the pressure-volume characteristic. Consideration can be given, for example, during application of control to a brake booster and/or to at least one hydraulic component of a hydraulic system of the braking system, to the pressure-volume characteristic already derivable at the beginning of the braking operation, so that a desired or predefined booster characteristic curve (jump-in, gain) and/or a desired or predefined recovery comfort level continue to be ensured.

The present invention thus makes it possible to react, during a braking operation itself, to a deviation of a current pressure-volume characteristic from the predefined pressure-volume characteristic curve. Impacts on comfort due to delay fluctuations or changes in pedal travel thus do need to be accepted when taking into consideration the current pressure-volume characteristic of the braking system.

In an advantageous refinement of the present invention, the example method encompasses the additional step of: determining an adapted volume difference for the first pressure and the second pressure in consideration of the stored volume difference for the first pressure and the second pressure, of a difference between the first volume indication and the first volume, and of a difference between the second volume indication and a volume value of the derived second pressure-volume value pair; or determining an adapted pressure difference for the first volume and the second volume in consideration of the stored pressure difference for the first volume and the second volume, of a difference between the first pressure indication and the first pressure, and of a difference between the second pressure indication and a pressure value of the derived second pressure-volume value pair.

The volume value of the derived second pressure-volume value pair can thus be redefined in consideration of the adapted volume difference, or the pressure value of the derived second pressure-volume value pair can be redefined in consideration of the adapted pressure difference. As explained below in more detail, an even more accurate prediction or prognosis of the second pressure-volume value pair is thereby possible. A more accurate adaptation of the pressure-volume characteristic of the braking system is thus also possible, thus ensuring more accurate conformity with a desired or predefined functionality of the braking system when this pressure-volume characteristic is taken into account upon application of control to at least one braking system component of the braking system.

In an advantageous embodiment of the method, the predefined pressure-volume characteristic curve is adapted to a current state of the braking system by the fact that at least some of the method steps (of the method) are respectively executed for at least some pressures of a predefined series of pressures. The adapted pressure-volume characteristic curve can then be stored on a storage device.

Preferably, after a cornering operation, only the method steps S1 and S2 for adapting the predefined pressure-volume characteristic curve are respectively executed for at least some pressures of the predefined series. As explained in more detail below, this embodiment of the method makes use of the fact that the centrifugal forces occurring during cornering have effects on a distance between a brake disc and a brake piston, but they do not contribute to brake lining wear. Thanks to the omission of the method steps (b) to (f), the embodiment of the method described here is optimized in terms of the effects of centrifugal forces.

As a supplement or alternative thereto, after a cornering operation at least some of the method steps (e.g., only method steps S1 and S2) for adapting the predefined pressure-volume characteristic curve can be respectively executed only for pressures of the predefined series below a predefined threshold value less than a maximum of the predefined series. This embodiment of the method is also optimized in terms of the effects of centrifugal forces.

The method steps S1, S2, S3-1, and S4-1, or the method steps S1, S2, S3-2, and S4-2, for adapting the predefined pressure-volume characteristic curve can furthermore be respectively executed for the predefined series of pressures after a predefined driving time, after a predefined driving distance, and/or after a predefined time interval. The pressure-volume characteristic curve can thus be cyclically adapted to a brake lining wear.

The advantages described above are also achievable by way of a corresponding evaluation and/or control apparatus for at least one braking system component of a braking system of a vehicle.

A brake booster for a braking system of a vehicle, a hydraulic assemblage control device for a braking system of a vehicle, and a braking system for a vehicle (according to the embodiments of the method or of the evaluation and/or control apparatus) furthermore also offer the advantages described above.

BRIEF DESCRIPTION OF THE DRAWINGS

Further features and advantages of the present invention are explained below with reference to the Figures.

DETAILED DESCRIPTION OF EXAMPLE EMBODIMENTS

Figure 1:
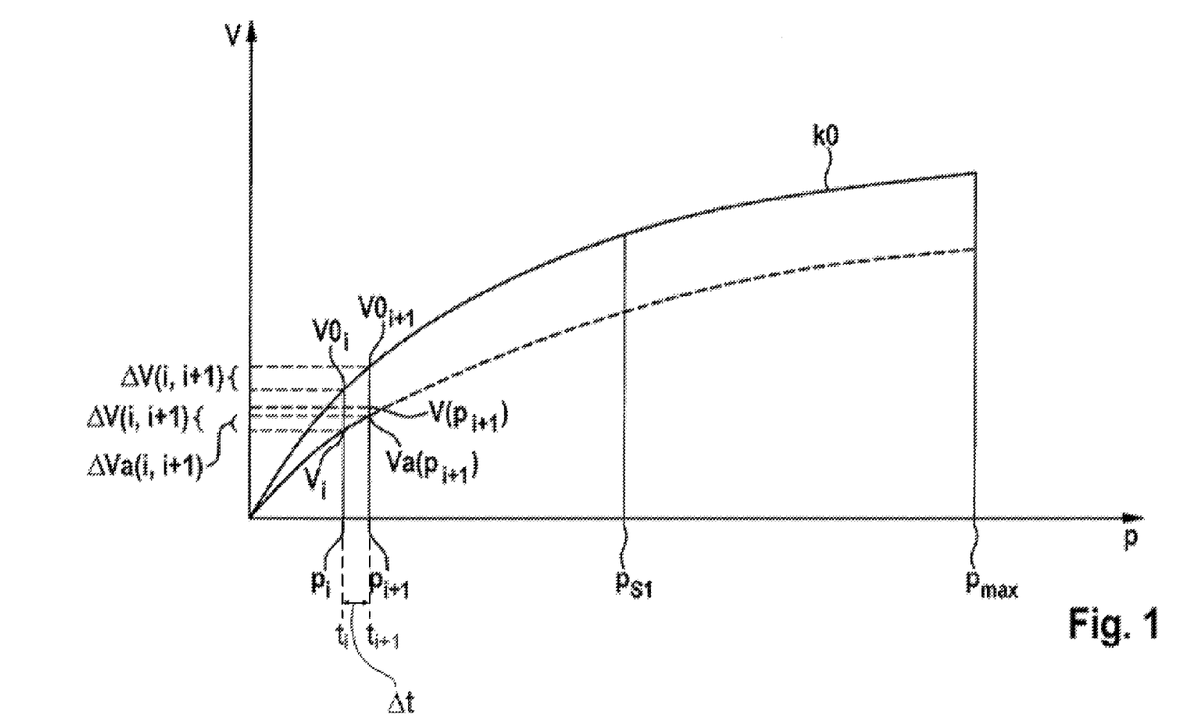
FIG. 1 shows a coordinate system to explain an embodiment of the method for ascertaining a pressure-volume characteristic of a braking system of a vehicle.

FIG. 1 shows a coordinate system to explain an embodiment of the example method for ascertaining a pressure-volume characteristic of a braking system of a vehicle.

The coordinate system of FIG. 1 reproduces by way of its abscissa a pressure p occurring during a pressure rise in the respective braking system (in at least a sub-region of the braking system). Preferably the pressure p is a brake pressure. A volume V to be displaced in order to produce the pressure p is depicted by way of an ordinate of the coordinate system of FIG. 1.

A predefined pressure-volume characteristic curve k0 plotted in FIG. 1 reproduces the volume V as a function of pressure p. By way of example, the predefined pressure-volume characteristic curve k0 is subdivided into interpolation points at intervals of 1 bar. Volume gradients can thus easily be calculated from the predefined pressure-volume characteristic curve k0. It is noted, however, that the method steps described below can also be executed for an alternative pressure-volume characteristic curve that indicates pressure p as a function of volume V.

It is also noted that an implementability of the method described here is not limited either to a specific type of braking system or to a specific type of vehicle or motor vehicle. The method can instead be implemented in the context of a plurality of different braking systems and different vehicles or motor vehicles equipped therewith.

The method starts at a beginning of a braking operation executed by way of the respective braking system. The braking operation can be, for example, a braking operation predefined by a driver via an actuation of a brake actuation element or brake pedal. The braking operation can also, however, be an autonomous braking operation (with no actuation of the brake actuation element or brake pedal by the driver) requested by an automatic speed control system of the respective vehicle. The pressure p occurring (in at least the sub-region of the braking system) can thus be at least partly produced by way of a driver braking force or can be produced without a driver braking force. At least one motorized actuator and/or at least one brake booster upstream from a brake master cylinder, for example a vacuum brake booster and/or an electromechanical brake booster, can also be used as an alternative to or as assistance for the driver braking force. The at least one motorized actuator can be or encompass, for example, at least one pump and/or at least one motorized piston-cylinder apparatus (having a linearly displaceable piston).

Figure 3:
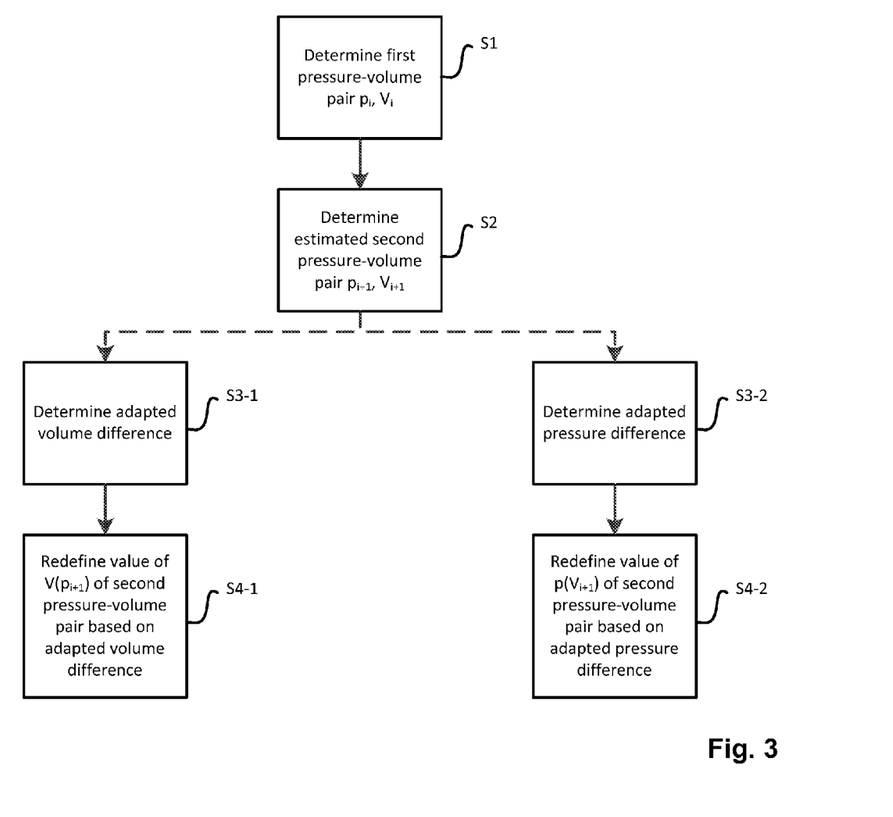
FIG. 3 is a flowchart illustrating methods according to example embodiments of the present invention.

In the example embodiment of the present invention described here, referring to FIG. 3, a method step S1 is executed at a point in time $t_i$. In method step S1, a first pressure-volume value pair is determined from a first pressure $p_i$ occurring in the braking system during a pressure rise or during the braking operation and from a first volume $V_i$ displaced in order to produce the first pressure $p_i$. The first pressure $p_i$ and the first volume $V_i$ are measured and/or estimated for this purpose. If the first pressure $p_i$ and/or the first volume $V_i$ are estimated, this is done without the predefined pressure-volume characteristic curve k0.

The first pressure $p_i$ can be measured, for example, by way of at least one pressure sensor. In particular, the first pressure $p_i$ can also be an average of several measured values of several pressure sensors. At least one volume sensor and/or at least one travel sensor can be used, for example, to measure the first volume $V_i$. The at least one travel sensor is preferably disposed on a brake actuation element or brake pedal on a force transfer component adjustable by way of the brake actuation element or brake pedal, and/or on the at least one motorized actuator or brake booster, in such a way that the first volume $V_i$ displaced by way of the brake actuation element or brake pedal and/or by way of the at least one motorized actuator or brake booster can be estimated or ascertained, in consideration of at least one predefined model, by way of at least one sensor signal of the at least one travel sensor. The at least one travel sensor can be, for example, a rod travel sensor. It is noted once again that the first volume $V_i$ can encompass or be a brake fluid volume forced out of a brake master cylinder of the braking system (as a result of an actuation of the brake actuation element or brake pedal by the driver and/or an operation of the at least one brake booster), and/or a brake fluid volume transferred out of a fluid reservoir by way of the at least one motorized actuator.

The example method also has a method step S2 in which a second pressure-volume pair, for a second pressure $p_{i+1}$ higher than the first pressure $p_i$, is derived. The second pressure-volume value pair for the second pressure $p_{i+1}$ is derived in consideration at least of the first pressure-volume value pair and of a volume difference $\Delta V(i,i+1)$, stored in the predefined pressure-volume characteristic curve k0, for the first pressure $p_i$ and the second pressure $p_{i+1}$ (or in consideration at least of the first pressure-volume value pair and of a pressure difference stored in the predefined pressure-volume characteristic curve k0, for the first volume $V_i$ and the second volume $V_{i+1}$). The volume difference $\Delta V(i,i+1)$ is a difference between a first volume indication $V0_i$ associated (in the predefined pressure-volume characteristic curve k0) with the first pressure $p_i$ and a second volume indication $V0_{i+1}$ (in the predefined pressure-volume characteristic curve k0) associated with the second pressure $p_{i+1}$. In the exemplifying embodiment of FIG. 1 the volume difference $\Delta V(i,i+1)$ for the first pressure $p_i$ and the second pressure $p_{i+1}$ is defined according to equation (1) as:

$$\Delta V(i,i+1) = V0_{i+1} - V0_i \qquad \text{(eq. 1)}$$

The volume difference $\Delta V(i,i+1)$ can also be, in particular, a pressure gradient stored by way of the pressure-volume characteristic curve k0, provided the pressures $p_i$ and $p_{i+1}$ are selected to be close to one another.

A (probable) volume value $V(p_{i+1})$ for the second pressure $p_{i+1}$ can thus be calculated according to equation (2) as:

$$V(p_{i+1}) = V_i + \Delta V(i,i+1) \qquad \text{(eq. 2)}$$

It is noted that execution of method step S2 requires less time than a time interval $\Delta t$ (where $t_i + \Delta t = t_{i+1}$) that elapses when before the pressure curve rises (during the braking operation executed by the braking system) from the first pressure $p_i$ to the second pressure $p_{i+1}$. The method step S2 thus enables a prediction or prognosis of the pressure-volume ratio between the second pressure $p_{i+1}$ and the volume value $V(p_{i+1})$ (that is probable for the second pressure $p_{i+1}$). Because this prediction or prognosis can already be present before the pressure curve has risen to the second pressure $p_{i+1}$, it is already possible to react to the predicted or prognosticated pressure-volume ratio prior to $t_i$. In particular, control can already be applied in timely fashion to the at least one brake booster and/or at least one hydraulic component of a hydraulic system of the braking system, e.g., at least one pump, at least one valve, and/or to the at least one motorized actuator, in such a way that despite a deviation of the (probable) volume value $V(p_{i+1})$ from the second volume indication $V0_{i+1}$ associated in the predefined pressure-volume characteristic curve k0 with the second pressure $p_{i+1}$, a desired functionality of the braking system exists. It is possible to ensure in this manner, for example, that a preferred booster characteristic curve and/or an advantageous recuperation efficiency is conformed to.

The method steps S1 and S2 are generally already sufficient to detect a shift of the predefined pressure-volume characteristic curve k0 parallel to the ordinate due to a cornering operation, in particular fast cornering. Upon (fast) cornering, centrifugal forces occur which can contribute to an increase in a distance between a brake disc and a brake piston. This often results in the need for an additional volume uptake into the wheel brake cylinders of the braking system in order to close up the increased distance. By way of the method steps S1 and S2 described here, however, the shift of the predefined pressure-volume characteristic curve k0 parallel to the ordinate can be already be detected so early on that the additional volume uptake can be effected by corresponding application of control to the at least one brake booster and/or to the at least one hydraulic component.

The centrifugal forces occurring in the context of (fast) cornering have no effects on the brake linings. A stiffness of a brake lining thus does not change during (fast) cornering. There is therefore no need to redefine or correct the volume difference $\Delta V(i,i+1)$ after (fast) cornering.

Optionally, however, the method can also have the method steps S3-1 and S4-1 with which a possibly decreased lining compressibility due to brake lining wear can be quickly and reliably detected or taken into account upon ascertainment of the pressure-volume characteristic.

For this, firstly in method step S3-1 an adapted volume difference $\Delta Va(i,i+1)$ for the first pressure $p_i$ and the second pressure $p_{i+1}$ is determined. The adapted volume difference $\Delta Va(i,i+1)$ is determined in consideration of the stored volume difference $\Delta V(i,i+1)$ for the first pressure $p_i$ and the second pressure $p_{i+1}$, of a difference $\Delta V_i$ between the first volume indication $V0_i$ and the first volume $V_i$, and of a difference $\Delta V_{i+1}$ between the second volume indication $V0_{i+1}$ and the volume value $V(p_{i+1})$ (of the derived second pressure-volume value pair).

The difference $\Delta V_i$ between the first volume indication $V0_i$ and the first volume $V_i$ is defined according to equation (3) as:

$$\Delta V_i = V0_i - V_i \qquad \text{(eq. 3)}$$

The difference $\Delta V_{i+1}$ between the second volume indication $V0_{i+1}$ and the volume value $V(p_{i+1})$ is correspondingly defined according to equation (4) as:

$$\Delta V_{i+1} = V0_{i+1} - V(p_{i+1}) \qquad \text{(eq. 4)}$$

The adapted volume difference $\Delta Va(i,i+1)$ can thus be calculated according to equation (5) as:

$$\Delta Va(i,i+1) = \Delta V(i,i+1) * (\Delta V_{i+1}/\Delta V_i) \qquad \text{(eq. 5)}$$

In method step S4-1 the volume value $V(p_{i+1})$ of the derived second pressure-volume value pair (constituting an adapted volume value $Va(p_{i+1})$) is then redefined in consideration of the adapted volume difference $\Delta Va(i,i+1)$. This is done according to equation (6) as follows:

$$Va(p_{i+1}) = V(p_{i+1}) * \Delta Va(i,i+1) \qquad \text{(eq. 6)}$$

It is noted that all the method steps S2, S3-1, and S4-1 can be executed before the time interval $\Delta t$ elapses. The adapted volume value $Va(p_{i+1})$ for the second pressure $p_{i+1}$ can thus also be predicted or prognosticated before the second pressure $p_{i+1}$ is actually present in the braking system. By taking into consideration the adapted volume value $V_a(p_{i+1})$ for the second pressure $p_{i+1}$ it is thus possible to react, at least as of the time $t_{i+1}$, even to a brake lining wear that has just occurred, so that delay fluctuations or brake travel changes can be counteracted despite the brake lining wear.

The example method described here thus offers, in contrast to the existing art, the possibility of identifying deviations of the pressure-volume characteristic of the braking system from the predefined pressure-volume characteristic curve k0 while a braking operation is still occurring, and reacting to them in targeted fashion while the braking operation is still occurring. It is also noted that an inexpensive electronic system requiring little installation space is usable in order to execute the method steps S1, S2, S3-1, and S4-1.

Execution of the example method described here makes it possible in particular to adapt the predefined pressure-volume characteristic curve k0 to a current state of the braking system by respectively executing at least some of the method steps S1, S2, S3-1, and S4-1 for at least some pressures p of a predefined series of pressures p. The pressures p of the predefined series can be predefined at different distances from one another. For example, while the lower pressures p of the predefined series are at most at a first distance from one another, the higher pressures p of the predefined series can be at least at a second distance from one another that is greater than the first distance.

Consideration can be given in particular to the fact that starting at a first threshold value $p_{s1}$ less than a maximum $p_{max}$ of the predefined series of pressures p, a stiffness of the brake is constant. This means that a slope of the predefined pressure-volume characteristic curve k0 starting at the first threshold value $p_{s1}$ is also constant. (The first threshold value $p_{s1}$ can be, for example, between 50 and 120 bar, preferably between 60 and 100 bar, with preference between 70 and 90 bar. For example, the first threshold value $p_{s1}$ can be defined at 80 bar.)

An adaptation of a region of the predefined pressure-volume characteristic curve k0 between the first threshold value $p_{s1}$ and the maximum $p_{max}$ of the predefined series can thus be calculated with an interpolation from the stored characteristic curve, in accordance with the following equations (7) and (8), as:

$$\Delta V(S1,\max) = V0_{max} - V0_{s1} \qquad \text{(eq. 7)}$$

where $V0_{s1}$ is a volume indication associated (in the predefined pressure-volume characteristic curve k0) with the first threshold value $p_{s1}$, and $V0_{max}$ is a volume indication associated (in the predefined pressure-volume characteristic curve k0) with the maximum $p_{max}$. Thus:

$$V(p_{max}) = V_{s1} - \Delta V(S1,\max) \qquad \text{(eq. 8)}$$

A probable volume $V(p_{max})$ for the maximum $p_{max}$ can thus easily be derived from the (measured or estimated) volume $V_{s1}$ at the first threshold value $p_{s1}$.

After a cornering operation, preferably only the method steps S1 and S2 for adapting the predefined pressure-volume characteristic curve k0 are respectively executed for at least some pressures of the predefined series. In addition, after a cornering operation the method steps S1 and S2 for adapting the predefined pressure-volume characteristic curve k0 are respectively executed only for pressures p of the pressure series below a predefined second threshold value lower than the maximum $p_{max}$ of the predefined series. (The second threshold value can be greater than, less than, or equal to the first threshold value $p_{s1}$.)

It is furthermore preferred if the method steps S1, S2, S3-1 and S4-1 for adapting the predefined pressure-volume characteristic curve k0 are respectively executed for the predefined series of pressures p after a predefined driving time, after a predefined driving distance, and/or after a predefined time interval. The predefined pressure-volume characteristic curve k0 can thus be cyclically adapted to a current brake lining wear.

It is noted once again that modifications of the method steps described above can be implemented for a pressure-volume characteristic curve that indicates pressure p as a function of volume V.

Figure 2:
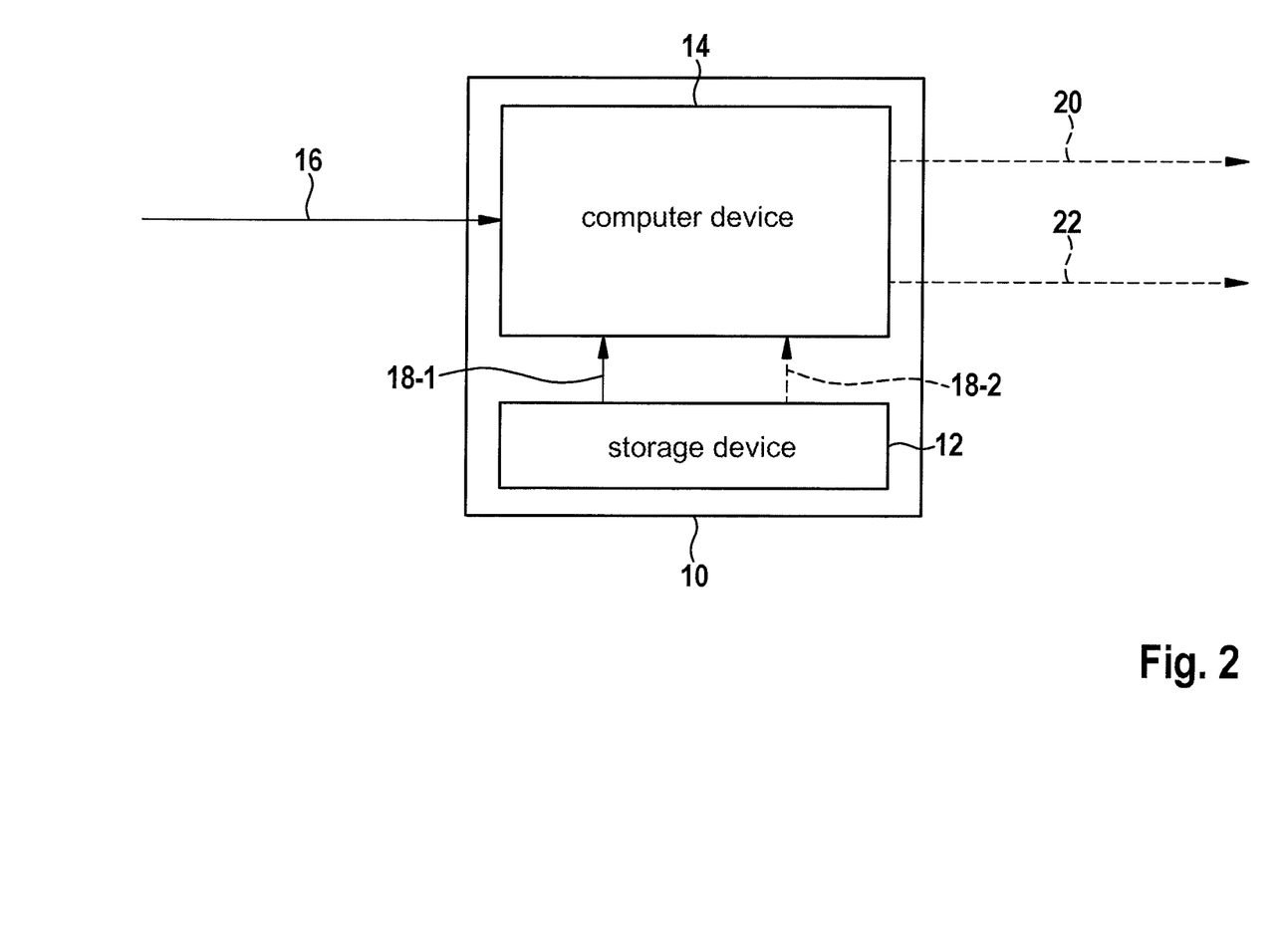
FIG. 2 schematically depicts an embodiment of the evaluation and/or control apparatus.

FIG. 2 schematically depicts an embodiment of the evaluation and/or control apparatus.

It is noted that evaluation and/or control apparatus 10 depicted schematically in FIG. 2 is usable for a plurality of different types of braking systems in various types of vehicles or motor vehicles. The usability of evaluation and/or control apparatus 10 is not limited either to a specific type of braking system or to a specific type of vehicle or motor vehicle.

Evaluation and/or control apparatus 10 has a storage device 12 on which a pressure-volume characteristic curve is stored. Evaluation and/or control apparatus 10 furthermore encompasses a computer device 14 that is designed to receive at least one furnished first pressure-volume value pair 16 made up of a first pressure occurring during a pressure rise in the braking system and of a first volume displaced in order to produce the first pressure. The first pressure and the first volume of the first pressure-volume value pair 16 can be estimated and/or measured by at least one sensor device (not sketched) of evaluation and/or control apparatus 10 and/or by at least one external sensor (not depicted). Possibilities for estimating and measuring the first pressure and the first volume are described above.

Computer device 14 is designed to define a second pressure-volume value pair for a second pressure higher than the first pressure or for a second volume greater than the first volume. This occurs, for example, in consideration at least of the first pressure-volume value pair 16 and of a volume difference 18-1 for the first pressure and the second pressure, stored in the predefined pressure-volume characteristic curve, between a first volume indication associated with the first pressure and a second volume indication associated with the second pressure. It is alternatively also possible to define the second pressure-volume value pair in consideration at least of the first pressure-volume value pair 16 and of a pressure difference 18-2 for the first volume and the second volume, stored in the predefined pressure-volume characteristic curve, between a first pressure indication associated with the first volume and a second pressure indication associated with the second volume. Similarly, referring to FIG. 3, according to the embodiment in which the second pressure-volume value pair is defined in consideration of pressure difference 18-2 for the first volume and the second volume, steps S3-2 and S4-2 can be performed instead of steps S3-1 and S4-1, so that an adapted pressure difference is determined (S3-2) and the value of the pressure as a function of $V_{i+1}$ (p(Vi+1) is redefined based on the adapted pressure difference. Computer device 14 can be designed in particular to execute at least some, preferably all, of the method steps described above.

An information item 20 inferred from at least the second pressure-volume value pair can then be outputtable. Preferably a control signal 22 defined in consideration at least of the second pressure-volume pair is outputtable by way of computer device 14 or by way of an evaluation device (not depicted). Examples of the vehicle components to which control can be applied by way of the at least one control signal 22 have already been recited above. After detection of a current pressure-volume characteristic of the braking system based at least on the second pressure-volume value pair, that characteristic can then be reacted to in targeted fashion by way of the at least one control signal 22.

The stored pressure-volume characteristic curve can also easily be modified by way of evaluation and/or control apparatus 10 during driving operation. Adaptation of the stored pressure-volume characteristic curve is accomplished based on the difference between the stored and the currently measured pressure characteristic or volume characteristic of the respective braking system.

A brake booster, for example an electromechanical brake booster or a vacuum brake booster, can also be equipped with evaluation and/or control apparatus 10 described above. In this case a desired booster characteristic curve of the brake booster can always be accurately conformed to despite changes in the current pressure-volume characteristic of the braking system.

A hydraulic assemblage control device equipped with evaluation and/or control apparatus 10 can likewise take the current pressure-volume characteristic of the braking system into consideration upon application of control to at least one hydraulic component, for example to a valve, to a pump, and/or to a piston-cylinder apparatus. In particular, a change in the pressure-volume characteristic of the braking system can be taken into account in the context of a blending operation in such a way that a desired recuperation efficiency can continue to be conformed to.

A braking system having evaluation and/or control apparatus 10 furthermore also creates the above-described advantages.

What is claimed is:

1. A method for operating a braking system of a vehicle, the method comprising:

obtaining sensor measurements of a value of a first pressure occurring in the braking system during a pressure rise and of a value of a first volume displaced to produce the first pressure, the obtained sensor values forming a first pressure-volume value, wherein a predefined pressure-volume characteristic curve associates a volume value different than the value of the first volume with the value of the first pressure and associates a pressure value different than the value of the first pressure with the value of the first volume; and prior to a second pressure and a second volume being reached in the braking system:

deriving a second pressure-volume value pair for the second pressure higher than the first pressure or for the second volume greater than the first volume based on at least the first pressure-volume value pair and (a) a volume difference between volumes associated by the predefined pressure-volume characteristic curve respectively with the first pressure and the second pressure or (b) a pressure difference between pressures associated by the predefined pressure-volume characteristic curve respectively with the first volume and the second volume; and controlling a component of the braking system based on the derived second pressure-volume value pair.

2. A method for ascertaining a pressure-volume characteristic of a braking system of a vehicle, the method comprising:

obtaining sensor measurements of value of a first pressure occurring in the braking system during a pressure rise and of a value of a first volume displaced to produce the first pressure, the obtained sensor values forming a first pressure-volume value pair;

deriving a second pressure-volume value pair; and determining an adapted difference;

wherein one of:

(a) the second pressure-volume value pair is derived for a second pressure higher than the first pressure based on at least the first pressure-volume value pair and a volume difference between volumes associated by a predefined pressure-volume characteristic curve respectively with the first pressure and the second pressure, and the adapted difference is an adapted volume difference for the first pressure and the second pressure in consideration of (i) the volume difference between the volumes associated by the predefined pressure-volume characteristic curve with the first pressure and the second pressure, (ii) a difference between the volume associated by the predefined pressure-volume characteristic curve with the first pressure and the first volume, and (iii) a difference between the volume associated by the predefined pressure-volume characteristic curve with the second pressure and a volume value of the derived second pressure-volume value pair; and (b) the second pressure-volume value pair is derived for a second volume greater than the first volume based on at least the first pressure-volume value pair and a pressure difference between pressures associated by the predefined pressure-volume characteristic curve respectively with the first volume and the second volume, and the adapted difference is an adapted pressure difference for the first volume and the second volume in consideration of (i) the pressure difference between the pressures associated by the predefined pressure-volume characteristic curve with the first volume and the second volume, (ii) a difference between the pressure associated by the predefined pressure-volume characteristic curve with the first volume and the first pressure, and (iii) a difference between the pressure associated by the predefined pressure-volume characteristic curve with the second volume and a pressure value of the derived second pressure-volume value pair.

3. The method as recited in claim 2, wherein the volume value of the derived second pressure-volume pair or the pressure value of the derived second pressure-volume value pair is redefined in consideration of the adapted difference.

4. The method as recited in claim 3, wherein the predefined pressure-volume characteristic curve is adapted to a current state of the braking system by the fact that at least some of the method steps are repeated for at least some pressures of a predefined series of pressures.

5. The method as recited in claim 4, wherein after a cornering operation, the steps of determining the first pressure-volume value pair and deriving the second pressure-volume value pair are repeated for the at least some pressures of the predefined series for the adapting of the predefined pressure-volume characteristic curve, the step of determining the adapted difference not being repeated for the adapting of the predefined pressure-volume characteristic curve.

6. The method as recited in claim 4, wherein after a cornering operation, at least some of the method steps for adapting the predefined pressure-volume characteristic curve are repeated only for pressures of the predefined series that are below a predefined threshold value less than a maximum of the predefined series.

7. The method as recited in claim 6, wherein the steps of determining the first pressure-volume value pair, deriving the second pressure-volume value pair, and determining the adapted difference are repeated, for the adapting of the predefined pressure-volume characteristic curve, for an entire predefined series of pressures at least one of after a predefined driving time, after a predefined driving distance, and after a predefined time interval.

8. The method as recited in claim 2, wherein the predefined pressure-volume characteristic curve associates a volume value different than the value of the first volume with the value of the first pressure and associates a pressure value different than the value of the first pressure with the value of the first volume, and the derivation of the second pressure-volume value pair and the determination of the adapted difference are performed prior to the second pressure and second volume being reached in the braking system.

9. The method as recited in claim 8 further comprising, prior to the second pressure and second volume being reached in the braking system, controlling a component of the braking system based on the derived second pressure-volume value pair and the determined adapted difference.

10. An evaluation or control apparatus for at least one braking system component of a braking system of a vehicle, the apparatus comprising:

a storage device on which a pressure-volume characteristic curve is stored; and a computer device configured to:

obtain from sensors measurements of a value of a first pressure occurring during a pressure rise in the braking system and of a value of a first volume displaced in order to produce the first pressure, the obtained sensor values forming a first pressure-volume value, wherein the pressure-volume characteristic curve associates a volume value different than the value of the first volume with the value of the first pressure and associates a pressure value different than the value of the first pressure with the value of the first volume; and prior to a second pressure and a second volume being reached in the braking system:

derive a second pressure-volume value pair for the second pressure higher than the first pressure or for the second volume greater than the first volume based on at least the first pressure-volume value pair and (a) a volume difference between volumes associated by the pressure-volume characteristic curve respectively with the first pressure and the second pressure or (b) a pressure difference between pressures associated by the pressure-volume characteristic curve respectively with the first volume and the second volume; and output at least one of: i) an information item inferred from at least the second pressure-volume value pair, and ii) a control signal for controlling the at least one braking system component and defined in consideration of at least the second pressure-volume value pair.

11. A brake booster for a braking system of a vehicle, the brake booster comprising an evaluation or control apparatus at least one braking system component of the braking system, the apparatus comprising:

a storage device on which a pressure-volume characteristic curve is stored; and a computer device configured to:

obtain from sensors measurements of a value of a first pressure occurring during a pressure rise in the braking system and of a value of a first volume displaced in order to produce the first pressure, the obtained sensor values forming a first pressure-volume value, wherein the pressure-volume characteristic curve associates a volume value different than the value of the first volume with the value of the first pressure and associates a pressure value different than the value of the first pressure with the value of the first volume; and prior to a second pressure and a second volume being reached in the braking system:

derive a second pressure-volume value pair for the second pressure higher than the first pressure or for the second volume greater than the first volume based on at least the first pressure-volume value pair and (a) a volume difference between volumes associated by the pressure-volume characteristic curve respectively with the first pressure and the second pressure or (b) a pressure difference between pressures associated by the pressure-volume characteristic curve respectively with the first volume and the second volume; and output at least one of: i) an information item inferred from at least the second pressure-volume value pair, and ii) a control signal for controlling the at least one braking system component and defined in consideration of at least the second pressure-volume value pair.

12. A hydraulic assemblage control device for a braking system of a vehicle, the control device comprising an evaluation or control apparatus for at least one braking system component of the braking system, the apparatus comprising:

a storage device on which a pressure-volume characteristic curve is stored; and a computer device configured to:

obtain from sensors measurements of a value of a first pressure occurring during a pressure rise in the braking system and of a value of a first volume displaced in order to produce the first pressure, the obtained sensor values forming a first pressure-volume value, wherein the pressure-volume characteristic curve associates a volume value different than the value of the first volume with the value of the first pressure and associates a pressure value different than the value of the first pressure with the value of the first volume; and prior to a second pressure and a second volume being reached in the braking system:

derive a second pressure-volume value pair for the second pressure higher than the first pressure or for the second volume greater than the first volume based on at least the first pressure-volume value pair and (a) a volume difference between volumes associated by the pressure-volume characteristic curve respectively with the first pressure and the second pressure or (b) a pressure difference between pressures associated by the pressure-volume characteristic curve respectively with the first volume and the second volume; and output at least one of: i) an information item inferred from at least the second pressure-volume value pair, and ii) a control signal for controlling the at least one braking system component and defined in consideration of at least the second pressure-volume value pair.

13. A braking system for a vehicle comprising an evaluation or control apparatus for at least one braking system component of the braking system, the evaluation or control apparatus comprising:

a storage device on which a pressure-volume characteristic curve is stored; and a computer device configured to:

obtain from sensors measurements of a value of a first pressure occurring during a pressure rise in the braking system and of a value of a first volume displaced in order to produce the first pressure, the obtained sensor values forming a first pressure-volume value, wherein the pressure-volume characteristic curve associates a volume value different than the value of the first volume with the value of the first pressure and associates a pressure value different than the value of the first pressure with the value of the first volume; and prior to a second pressure and a second volume being reached in the braking system:

derive a second pressure-volume value pair for a second pressure higher than the first pressure or for a second volume greater than the first volume based on at least the first pressure-volume value pair and (a) a volume difference between volumes associated by the pressure-volume characteristic curve respectively with the first pressure and the second pressure or (b) a pressure difference between pressures associated by the pressure-volume characteristic curve respectively with the first volume and the second volume; and output at least one of: i) an information item inferred from at least the second pressure-volume value pair, and ii) a control signal for controlling the at least one braking system component and defined in consideration of at least the second pressure-volume value pair.

\* \* \* \* \*